J. F. TRUDEAU.
WASTE PACKED SLEEVE BEARING.
APPLICATION FILED AUG. 7, 1918.
1,313,507.
Patented Aug. 19, 1919.
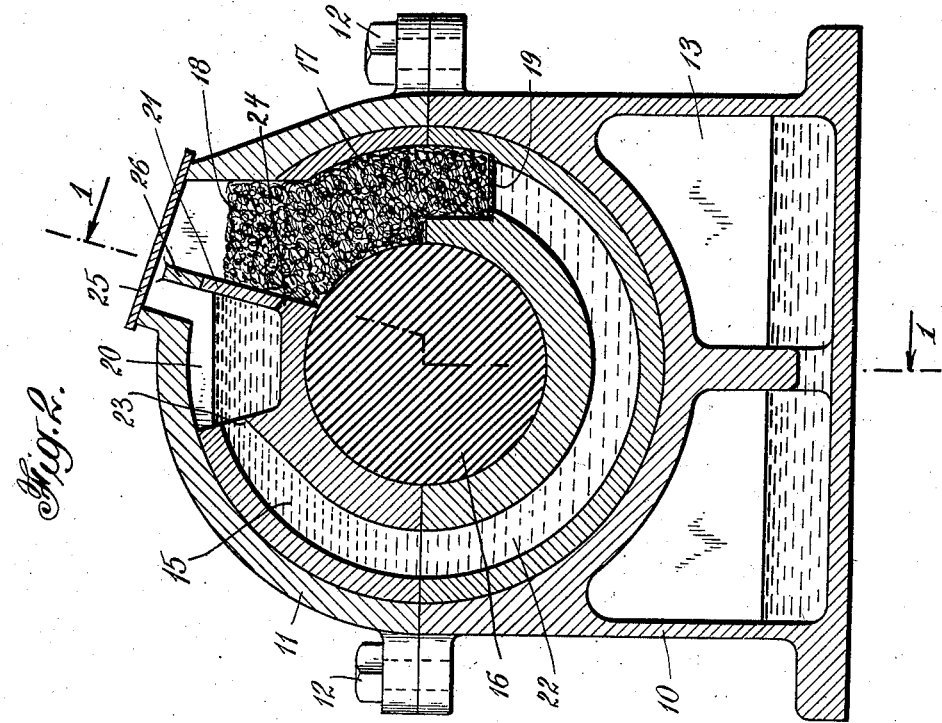
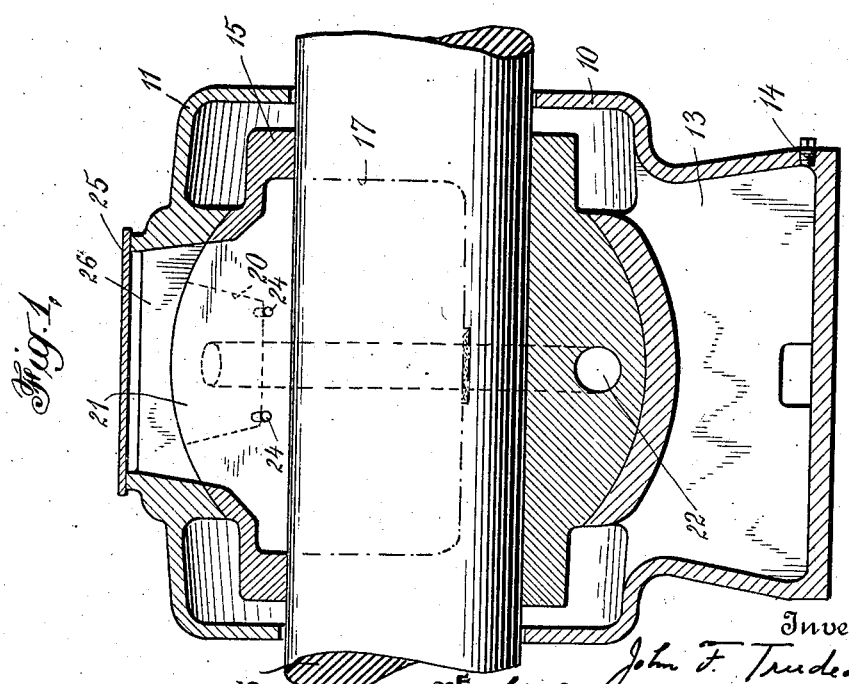
Inventor
John F. Trudeau.
By his Attorneys
Pennie, Davis, Marvin & Edmonds

UNITED STATES PATENT OFFICE.

JOHN F. TRUDEAU, OF BAYONNE, NEW JERSEY, ASSIGNOR TO ELECTRO-DYNAMIC COMPANY, OF BAYONNE, NEW JERSEY, A CORPORATION OF NEW JERSEY.

WASTE-PACKED SLEEVE-BEARING.

1,313,507.      Specification of Letters Patent.      Patented Aug. 19, 1919.

Application filed August 7, 1918. Serial No. 248,744.

*To all whom it may concern:*

Be it known that I, JOHN F. TRUDEAU, a citizen of the United States, residing at Bayonne, in the county of Hudson and State of New Jersey, have invented certain new and useful Improvements in Waste-Packed Sleeve-Bearings; and I do hereby declare the following to be a full, clear, and exact description of the invention, such as will enable others skilled in the art to which it appertains to make and use the same.

The present invention, which relates to waste-packed journal bearings has for an object the production of a bearing of simple, effective and rugged construction, in which the material or packing used as an aid in lubricating the shaft is independent of the member or journal box within which the sleeve is mounted, so that variations in position of the bearing sleeve, with respect to this member or box, do not lessen the effectiveness of the lubricating packing; and in which the supply of lubricant to the packing is effectively provided for.

To this end the packing employed for absorbing lubricant is contained within the bearing sleeve in a pocket which has an opening toward the journal so that all the lubricant supplied to the pocket is effectively applied to and absorbed by the packing and the packing follows, and remains in close contact with, the journal under all conditions of displacement of the sleeve. The construction is thus rendered particularly suitable for self-alining bearings.

The invention further provides in conjunction with the pocket for holding the packing, a reservoir for holding lubricant and a passageway through which lubricant may be supplied from the reservoir to the pocket to saturate the packing therein and lubricate the shaft; and both the reservoir and the passageway are formed entirely within the bearing sleeve so that they, like the pocket, are independent of the journal box of the bearing. Access to the reservoir and the pocket may be obtained through a common aperture provided in the journal box or housing within which the bearing sleeve is mounted.

Other objects and advantages of the invention will appear more clearly from a description of a preferred embodiment thereof, as shown in the accompanying drawing in which Figure 1 is an elevation showing the journal box and bearing sleeve or bushing in longitudinal section, and Fig. 2 is a transverse section through the central portion of Fig. 1, showing the section line 1—1 along which Fig. 1 is taken.

The journal box here shown, which is of standard construction and forms no novel part of the invention, is formed of two parts 10 and 11, connected to each other by suitable fastening devices 12. The lower member of the journal box is provided with a chamber 13 to receive the used lubricant which has passed out of the bearing, and a suitable tap is provided at 14 to permit the withdrawal of such lubricant.

In the embodiment of the invention shown herein, the bearing is of the self-alining type, and the bearing sleeve 15 is accordingly mounted to have a limited amount of movement within the journal box. The bearing sleeve may be constructed of two or more sections suitably attached to each other and surrounding the shaft 16.

The bearing sleeve is recessed to form a pocket 17 opening toward the journal and adapted to receive waste or other suitable packing material 18 and having at its bottom an oil distributing screen or perforated plate 19, supported on shoulders formed at the bottom of the pocket. Adjacent the upper end of the pocket is a reservoir 20 formed in the bearing sleeve and separated from the pocket by a portion of the sleeve formed as a wall 21. The reservoir is intended to hold lubricant; and to permit the same to be supplied to the packing in the pocket, a passageway or duct 22 extends from the reservoir circumferentially with respect to the journal and communicates with the bottom of the pocket. This duct is the main passageway through which lubricant is supplied from the reservoir to saturate the packing, but it will be of advantage to provide one or more restricted apertures 24 in the wall 21 between the bottom of the reservoir and the pocket so that the top portions of the packing may be thoroughly saturated with lubricant.

Preferably the opening 23 of the duct 22 into the reservoir 20 is well above the bottom of the reservoir and the apertures 24 so that, in effect, a reserve supply of lubricant is provided to be fed to the packing from the ample duct 22 and from the reservoir 20 through apertures 24 after the level of the lubricant in the reservoir falls below the opening 23. Thus, when the attendant inspecting the bearing observes that the opening 23 is uncovered, he will be warned to refill the reservoir, but in the meantime, and for some considerable reserve period, the supply of lubricant will be maintained both to the top and the bottom of the packing.

To permit access to the packing pocket and the reservoir, the upper member 11 of the journal box is provided with an aperture covered by a suitable closure 25. The upper member of the journal box may also be provided with a partition 26 extending across the opening and registering with the upper edge of the wall 21. This partition serves to divide the opening in the journal box into two parts and also prevents splashing and spilling of oil over the top of the wall 21 into the packing.

By virtue of the construction described above, the packing will at all times be adequately supplied with lubricant from both above and below through direct passages and from a reservoir within the bearing sleeve and easily accessible to the attendant. Since the packing is contained in a pocket within the bearing sleeve, it will always follow the journal, if the sleeve moves with respect to the journal box, as it may do in case of deflection or other disalinement, as of a self-alining bearing. By forming the reservoir and the supply duct entirely within the bearing sleeve, they are independent of the position of the sleeve with respect to the journal box, so that the path over which the lubricant flows from the reservoir to the packing is constant, thus insuring a uniform supply of lubricant to the journal.

I claim:

1. A waste-packed journal bearing comprising a journal box, and a bearing sleeve mounted in the journal box and having provided within itself a wide and deep pocket which opens toward the journal and which is adapted to contain substantially the entire supply of packing and to carry the same bodily with it during any displacement of the journal and sleeve with respect to the journal box; substantially as described.

2. A self-alining journal bearing comprising a journal box and a bearing sleeve mounted therein, the box and bearing sleeve being respectively shaped to permit self-alinement of the sleeve in the box, the sleeve having provided within itself a pocket opening toward the journal and adapted to constantly contain a comparatively large supply of lubricated packing, so that the packing will follow the journal in all positions of alinement thereof.

3. A journal bearing comprising a journal box, and a bearing sleeve mounted in the box and having provided within itself a pocket opening toward the journal and adapted to constantly contain a comparatively large supply of lubricated packing, so that the packing will follow the journal in any displacement thereof with respect to the journal box, said sleeve containing a reservoir which is in communication with said pocket for holding lubricant and supplying it to the packing.

4. A journal bearing comprising a journal box, and a bearing sleeve mounted in the box and having provided within itself a pocket opening toward the journal and adapted to constantly contain a comparatively large supply of lubricated packing, so that the packing will follow the journal in any displacement thereof with respect to the journal box, said sleeve containing in the upper portion thereof a reservoir for holding lubricant, and a duct extending circumferentially from the reservoir to the packing pocket.

5. A journal bearing comprising a journal box, and a bearing sleeve mounted in the box and containing within itself a pocket opening toward the journal and adapted to receive a packing of lubricated waste or the like so that the packing will follow the journal in any displacement thereof with respect to the journal box, said sleeve containing in the upper portion thereof a reservoir for holding lubricant, and also containing a duct extending circumferentially from the reservoir to the lower portion of the packing pocket and a relatively restricted passage extending from the reservoir to the upper portion of the packing pocket.

6. A journal bearing comprising a journal box, and a bearing sleeve mounted in the box and containing within itself a pocket opening toward the journal and adapted to receive a packing of lubricated waste or the like so that the packing will follow the journal in any displacement thereof with respect to the journal box, said sleeve containing in the upper portion thereof a reservoir for holding lubricant, and also containing a duct extending circumferentially from the reservoir to the lower portion of the packing pocket and a relatively restricted passage extending from the reservoir to the upper portion of the packing pocket, the opening from the reservoir into the duct being well above the bottom thereof and above the said restricted passage.

7. A journal bearing comprising a journal box, and a bearing sleeve mounted in the box and containing within itself a pocket opening toward the journal and adapted to receive a packing of lubricated waste or the like so that the packing will follow the journal in any displacement thereof with respect to the journal box, said sleeve containing also a reservoir for holding lubricant and supplying it to the packing, and said journal box having a covered port opening into both the reservoir and the packing pocket.

8. A journal bearing comprising a journal box, and a bearing sleeve mounted in the box and containing within itself a pocket opening toward the journal and adapted to receive a packing of lubricated waste or the like so that the packing will follow the journal in any displacement thereof with respect to the bearing box, said sleeve containing also a reservoir for holding lubricant and supplying it to the packing, and said journal box having a covered port opening into both the reservoir and the packing pocket, and a partition wall formed in the sleeve opposite the port and between the reservoir and the packing pocket.

9. A journal bearing comprising a journal box, and a bearing sleeve mounted in the box and containing within itself a pocket opening toward the journal and adapted to receive a packing of lubricated waste or the like so that the packing will follow the journal in any displacement thereof with respect to the journal, said sleeve containing also a reservoir for holding lubricant and supplying it to the packing, and said journal box having a covered port opening into both the reservoir and the packing pocket, and partition walls in alinement with one another formed in the sleeve and the journal box opposite the port and between the reservoir and the packing pocket.

10. A journal bearing comprising a journal box, and a bearing sleeve mounted in the box and containing within itself a pocket opening toward the journal and adapted to receive a packing of lubricated waste or the like so that the packing will follow the journal in any displacement with respect to the journal box, the bearing sleeve containing in the upper portion thereof a reservoir for holding lubricant and also containing a duct which extends from the reservoir to the packing pocket, the opening from the reservoir into said duct being located well above the bottom of the reservoir to maintain a reserve supply of lubricant in the reservoir to be fed to the packing from the duct after the level of the lubricant in the reservoir falls low enough to uncover said opening; substantially as described.

In testimony whereof I affix my signature.

JOHN F. TRUDEAU.

Copies of this patent may be obtained for five cents each, by addressing the "Commissioner of Patents, Washington, D. C."